(12) United States Patent
Molvig-Lundegaard et al.

(10) Patent No.: US 9,281,102 B2
(45) Date of Patent: Mar. 8, 2016

(54) ELECTRIC POWER CABLE FOR MEDIUM OR HIGH VOLTAGE

(75) Inventors: Liv Molvig-Lundegaard, Fredrikstad (NO); Georg Balog, Tranby (NO); Knut Magne Furuheim, Fredrikstad (NO)

(73) Assignee: NEXANS, Paris (FR)

( * ) Notice: Subject to any disclaimer, the term of this patent is extended or adjusted under 35 U.S.C. 154(b) by 255 days.

(21) Appl. No.: 13/503,691

(22) PCT Filed: Nov. 3, 2010

(86) PCT No.: PCT/EP2010/066766
§ 371 (c)(1),
(2), (4) Date: Jun. 19, 2012

(87) PCT Pub. No.: WO2011/054887
PCT Pub. Date: May 12, 2011

(65) Prior Publication Data
US 2012/0255760 A1    Oct. 11, 2012

(30) Foreign Application Priority Data
Nov. 3, 2009   (EP) .................................... 09306052

(51) Int. Cl.
*H01B 7/00* (2006.01)
*H01B 7/288* (2006.01)
*H01B 7/14* (2006.01)

(52) U.S. Cl.
CPC . *H01B 7/288* (2013.01); *H01B 7/14* (2013.01)

(58) Field of Classification Search
USPC .... 174/110 R, 110 SC, 113 R, 117 R, 120 R, 174/120 SR, 120 AR, 102 R, 103 R, 105, 106, 174/107, 108
See application file for complete search history.

(56) References Cited

U.S. PATENT DOCUMENTS

| | | | |
|---|---|---|---|
| 4,063,089 A * | 12/1977 | Gamba | 378/45 |
| 4,129,552 A * | 12/1978 | Galaj et al. | 524/256 |
| 4,145,567 A * | 3/1979 | Bahder et al. | 174/107 |
| 4,576,827 A * | 3/1986 | Hastings et al. | 427/462 |
| 4,623,755 A * | 11/1986 | Henkel et al. | 174/110 SR |
| 4,767,894 A * | 8/1988 | Schombourg | 174/106 SC |
| 5,010,209 A * | 4/1991 | Marciano-Agostinelli et al. | 174/23 C |
| 5,246,783 A * | 9/1993 | Spenadel et al. | 428/461 |
| 5,281,757 A * | 1/1994 | Marin et al. | 174/23 R |
| 5,719,218 A * | 2/1998 | Sarma | 524/100 |
| 5,874,513 A * | 2/1999 | Watanabe et al. | 526/348.1 |
| 6,259,030 B1 * | 7/2001 | Tanigawa et al. | 174/108 |
| 6,270,856 B1 * | 8/2001 | Hendewerk et al. | 427/487 |

(Continued)

FOREIGN PATENT DOCUMENTS

| | | |
|---|---|---|
| DE | 4135634 | 4/1993 |
| EP | 0700057 | 3/1996 |

(Continued)

OTHER PUBLICATIONS

International Search Report dated Feb. 26, 2010.

*Primary Examiner* — William H Mayo, III
(74) *Attorney, Agent, or Firm* — Sofer & Haroun, LLP

(57) ABSTRACT

An electric power cable for medium or high voltage without lead sheath is provided having at least one diffusion barrier (7) based on a metallized layer or a layer of polymer (HDPE). In addition there is a polymer (PUR) layer (6) for absorbing limited amounts of water that might after all pass through the diffusion barrier layer.

3 Claims, 1 Drawing Sheet

(56) References Cited

U.S. PATENT DOCUMENTS

| | | | |
|---|---|---|---|
| 6,455,769 B1 * | 9/2002 | Belli et al. | 174/23 C |
| 6,492,475 B1 * | 12/2002 | Egashira et al. | 526/153 |
| 6,524,702 B1 * | 2/2003 | Betso et al. | 428/379 |
| 7,087,842 B2 * | 8/2006 | Belli et al. | 174/110 R |
| 7,666,503 B2 * | 2/2010 | Easter | 428/379 |
| 8,089,000 B2 * | 1/2012 | Van Der Meer | 174/110 R |
| 2004/0065456 A1 | 4/2004 | Belli et al. | |

FOREIGN PATENT DOCUMENTS

| | | |
|---|---|---|
| GB | 1579123 | 11/1980 |
| JP | 61165907 | 7/1986 |

* cited by examiner

ELECTRIC POWER CABLE FOR MEDIUM OR HIGH VOLTAGE

RELATED APPLICATIONS

This application is a National Phase application of PCT/EP2010/066766, filed on Nov. 3, 2010, which in turn claims the benefit of priority from European Patent Application No. 09 306 0052.3, filed on Nov. 3, 2009, the entirety of which are incorporated herein by reference.

BACKGROUND

1. Field of the Invention

The present invention relates to the field of electric power cables, in particular for submarine use.

2. Description Of Related Art

Power cables commonly comprise a sheath layer consisting of lead to be used as a radial water barrier. This relates to submarine power cables, but is also relevant for other cables subjected to potential humid environment. Water and humidity are detrimental to electrical insulating materials for all power cables conducting electricity at medium and high voltages.

Electric cables are known without a lead sheath, but with other layers for preventing penetration of water or moisture into the insulation.

The German Patent DE4135634 relates to an optical communication cable with a metallized coating on the outside of the cable as vapour barrier.

The British patent GB1579123 relates to a submarine coaxial cable whereby a sealed return coaxial conductor also acts as a moisture barrier against moisture ingress to a dielectrical material.

The Japanese patent application JP61165907 relates to a submarine power cable with a laminated layer comprising a metallic foil. This patent is about a radial conductor barrier replacing a longitudinal filling compound.

None of these patents and application relates to high voltage power cables.

It is of particular importance for medium or high voltage electric power cables including insulation, to keep the insulation in a relatively dry environment. When high electrical stress is present in combination with humidity as in a medium or high voltage submarine cable, the insulation is exposed to a degradation process, which is often called water treeing. This degradation process increases with the level of humidity present. Medium and high voltage extruded polymer power cables are usually intended to have a calculated life expectancy of the insulation system. The degradation process should be so slow that it does not reduce the life expectancy of the cable, typically 25 to 50 years.

The problems with humid environments are in prior art solved by enclosing the insulation in a lead sheath as it is impervious to water, it tolerates bending without buckling, a degree of cyclic mechanical stresses and so on.

Because lead has a long history of successful operational experience, its use as water barrier has not been seriously challenged.

There are also some serious drawbacks when using a lead sheath as water barrier:
- It is heavy, making transport, laying and handling of the cable requiring the use of heavy duty equipment
- It has relatively low electrical conductivity, so when high short circuit rating is required, additional conductivity has to be added
- For dynamic use, the lead sheathing results in the cable having a low fatigue life making it unsuitable.

One of the problems that may arise when using possible alternatives to lead sheath is that the alternatives may represent water barriers that are less moisture proof than lead.

In medium and high voltage cables, a hygroscopic barrier that is reliable, throughout the lifetime of the cable, is of vital importance. Onset of insulation degradation, often called water treeing, will occur when the humidity at the insulation interface is high, i.e. around 70% relative humidity (RH).

A required barrier that prevents moisture to build to such level at the insulation has up to now been solved by a lead sheath layer with its advantages and drawbacks.

OBJECTS AND SUMMARY

In order to remedy such a problem, the present invention is a cable comprising at least one polymeric water diffusion barrier layer 7 and at least one water absorption layer 6 inside the said water diffusion barrier layer. If the requirements are especially high, as in application to very high voltage cables where the insulation system is highly stressed electrically, a third layer, 5, comprising a polymeric diffusion barrier, a metallized foil or a metallic layer may be inserted. For long cables, especially in submarine application, the layers and backing of the metallized foils must be electrically conductive, ("semiconductors"). This to hinder the build-up of high voltages and the ultimate electrical breakdown of the cables.

When subjected to water, a layer 7, 5 is adapted to bar water from penetrating into the cable and ultimately reach the insulation 3. A water diffusion barrier layer 7, 5 is not expected to be 100% effective over a long time. Between this water diffusion barrier layer 7, 5 and the insulator 3 there is arranged a water absorption layer 6 in order to absorb water that over time, pass through the diffusion barrier layer 7, 5 so that the penetrated water is hindered from passing on to the insulator layer 3.

The present invention provides for other means of protecting the insulation of power cables from a humid environment than using a lead sheath. The invention is using known diffusion barriers together with known moisture absorbing materials in a new combination for use with cables.

DETAILED DESCRIPTION OF THE INVENTION

Figure 1:
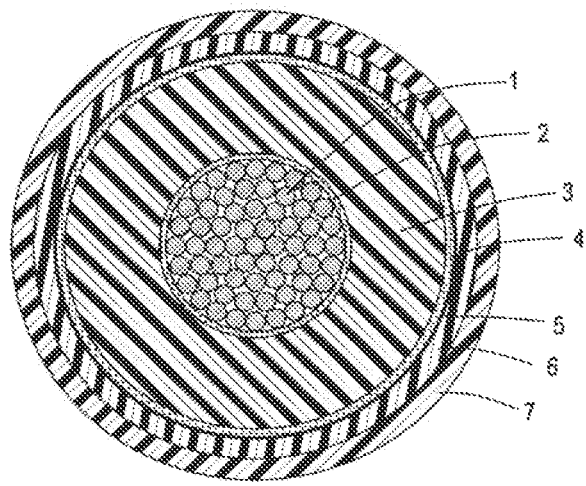
FIG. 1 is a cross section of an illustrative embodiment of the present invention showing some of the typical layers in a high voltage cable.

Referring to FIG. 1, a particular illustrative embodiment of the present invention is presented. An outer diffusion barrier comprises a polymer sheath layer 7 that is made with a material, for example an extruded high density polyethen (HDPE). Inside the first diffusion barrier layer, a layer 6 is arranged to be an absorbent of moisture and could be a material, for example an extruded polymer i.e. a polyurethane (PUR). Inside this layer there may be applied another layer 5 as a second diffusion barrier made of for example a metal film. This metal film may be in the form of a tape that comprises a metal with or without some material on one or both sides to ease bonding of the film to inside and outside layers 6, 7 as well as sealing the metal film to itself, thus forming a new diffusion barrier. In this way the speed of building up humidity is reduced and the cable insulation layer 3 is kept dry for a longer time even with a high pressure from the water on the outside of the cable.

For ease of understanding, referenced in the drawings are: a conductor 1, a conductor screen layer 2, an insulator layer 3, an insulation screen layer 4, a metal tape layer 5, a polymer sheath layer 6 used as an absorption layer and a polymer sheath layer 7 as a diffusion barrier layer. In addition to these are other layers used in the art to make cables. These additional layers are not shown in the figures.

As an alternative to the above embodiment, the metal film 5 may be deposited directly onto one or more layers (not shown in the drawings) on or outside the insulator 3.

Figure 2:
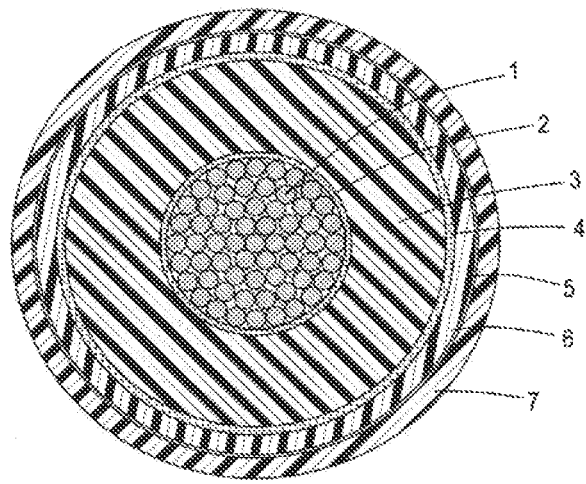
FIG. 2 is a cross section of an illustrative embodiment of the present invention showing an alternative structure of the typical layers in a high voltage cable.

Now referring to FIG. 2, another illustrative embodiment revealing an alternative realisation of the present invention is presented. The difference between this embodiment and the one described with reference to FIG. 1 is that the metal tape diffusion barrier layer 5 now is placed between the polymer diffusion barrier layer 7 and the absorbent polymer layer 6. The intention for this is the possibility of further reducing the speed of penetration of water molecules into the polymer sheath layer 6 and ultimately into the insulation layer 3.

In another realization of the present invention, not shown in the drawings, a high voltage power cable has just one diffusion barrier arranged as an outer layer of the cable.

In yet another realization of the present invention, not shown in the figures, a high voltage power cable has a diffusion barrier arranged as layers outside more than one layer outside the insulator layer 3.

In addition to the essential effects and advantages obtained regarding moisture and weight, although embodiments of single conductor cables are shown in FIGS. 1 and 2, it is obvious that quite corresponding structures according to the invention are applicable to three-phase cables.

The problem with eddy current in a metal sheath is solved by all the mentioned embodiments. For polymer cables without metal sheath it is evident that the problem is solved. Also when using metal tape layer(s) or otherwise metallized layers 5 the problem is solved due to the fact that traditional metal sheath usually is thicker than when using metal tape or otherwise metallized sheath layer(s) 5.

The invention claimed is:

1. Electric power cable for medium or high voltage, comprising;
   at least one conductor(s);
   insulation material surrounding said conductor(s); and
   layers for protection and for impeding penetration of water or moisture into the insulation material, wherein said layers include;
   a first water diffusion barrier layer constructed as at least one layer of metalized film, said metalized film having a material on at least one surface for sealing the film to itself and to an adjacent layer;
   at least one water absorption layer surrounding said first water diffusion barrier; and
   a second water diffusion barrier layer having at least one polymer sheath surrounding said at least one water absorption layer;
   wherein said at least one water absorption layer is bounded by said first and second water diffusion barrier layers, and
   wherein said first and second water diffusion barrier layers are arranged more than one layer outside said insulating material.

2. Electric power cable according to claim 1 wherein said at least one water absorption layer is a polymer.

3. Electric high voltage power cable according to claim 1, wherein the at least one layer of metallized film is either one of tape or deposited metal.

* * * * *